US011969386B2

(12) United States Patent
Heuerman et al.

(10) Patent No.: US 11,969,386 B2
(45) **Date of Patent: *Apr. 30, 2024**

(54) PATIENT SLIDER DEVICE

(71) Applicants: Spectrum Health Innovations, LLC, Grand Rapids, MI (US); Grand Valley State University, Allendale, MI (US)

(72) Inventors: Andrew Heuerman, Grand Rapids, MI (US); Eric VanMiddendorp, Rockford, MI (US); Michael Czechowskyj, Rockford, MI (US); Jason Barr, Lawton, MI (US); Mark C Celmer, Saint Joseph, MI (US); Vaughn Gerber, Portage, MI (US); Dylan DiGiovanni, Williamsburg, MI (US); Michael Matusiak, Grand Rapids, MI (US); Taylor Rieckhoff, Plymouth, MI (US); Dan Scheske, Grand Rapids, MI (US); Justin Dykstra, Wyoming, MI (US); Ashley Meitz, Jenison, MI (US); Garrett Goodwin, Grand Rapids, MI (US); Colin Jack, Grand Rapids, MI (US); Taylor Sims, Commerce Township, MI (US); Benjamin Vander Wal, Zeeland, MI (US); John Farris, Grand Rapids, MI (US); Chris Pung, Portland, MI (US); Dan Switzer, Mattawan, MI (US)

(73) Assignees: Grand Valley State University, Allendale, MI (US); Spectrum Health Innovations, LLC, Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/087,781

(22) Filed: Dec. 22, 2022

(65) Prior Publication Data

US 2023/0301856 A1 Sep. 28, 2023

Related U.S. Application Data

(63) Continuation of application No. 16/405,880, filed on May 7, 2019, now Pat. No. 11,554,066.

(Continued)

(51) Int. Cl.
*A61G 7/10* (2006.01)

(52) U.S. Cl.
CPC .......... *A61G 7/1026* (2013.01); *A61G 7/1046* (2013.01)

(58) Field of Classification Search
CPC ............................ A61G 7/1026; A61G 7/1046

(Continued)

(56) References Cited

U.S. PATENT DOCUMENTS 4,399,570 A * 8/1983 Tracy ..................... A61G 3/062 187/244
4,747,170 A * 5/1988 Knouse ................ A61G 7/1026 5/81.1 HS (Continued)

*Primary Examiner* — Justin C Mikowski
*Assistant Examiner* — Luke Hall
(74) *Attorney, Agent, or Firm* — Price Heneveld LLP

(57) ABSTRACT

A patient slider device configured to move a patient from a first bed surface to a second bed surface positioned adjacent thereto. The patient slider device includes a frame, a bed engagement assembly and a patient pulling assembly. The bed engagement assembly includes a bumper with the bumper being adjustable relative to the frame. The patient pulling assembly includes a winch assembly, preferably positioned proximate a lower end of the frame, and a sheet engaging clamp assembly. The sheet engaging clamp assembly includes a base member and a locking member structurally configured to clamp a sheet therebetween.

20 Claims, 18 Drawing Sheets

Related U.S. Application Data

(60) Provisional application No. 62/668,196, filed on May 7, 2018.

(58) Field of Classification Search
USPC .......................................................... 5/81.1 HS
See application file for complete search history.

(56) References Cited

U.S. PATENT DOCUMENTS 5,068,931 A * 12/1991 Smith .................. A61G 7/1046 5/84.1
5,544,371 A * 8/1996 Fuller .................. A61G 7/1015 5/85.1
6,282,734 B1 * 9/2001 Holberg ............... A61G 7/1026 5/81.1 HS
6,289,533 B1 * 9/2001 Hodgetts .............. A61G 7/1032 5/81.1 R
6,378,148 B1 * 4/2002 Votel .................... A61G 7/1019 5/81.1 R
6,496,991 B1 * 12/2002 Votel .................... A61G 7/1067 5/81.1 R
8,407,831 B2 * 4/2013 White .................. A61G 7/1017 5/89.1
2003/0074732 A1 * 4/2003 Hanson .................... A61G 7/08 5/81.1 R
2006/0053698 A1 * 3/2006 Minning .............. A61G 7/0533 5/81.1 R
2006/0090258 A1 * 5/2006 Stryker ................ A61G 7/1026 5/81.1 R
2006/0273292 A1 * 12/2006 Milam ..................... B66D 3/20 254/343
2007/0000049 A1 * 1/2007 White .................... A61G 7/001 5/84.1
2007/0056095 A1 * 3/2007 Scordato .............. A61G 7/1046 5/81.1 R
2008/0189852 A1 * 8/2008 Gramkow ............ A61G 7/1015 5/85.1
2009/0165203 A1 * 7/2009 Biersteker ................ A61G 5/14 5/83.1
2009/0178193 A1 * 7/2009 Jewell .................. A61G 7/1026 5/81.1 HS
2010/0235986 A1 * 9/2010 Klyne .................. A61G 7/1026 5/81.1 R
2016/0089291 A1 * 3/2016 Tilk ..................... A61G 7/1046 5/81.1 HS
2016/0184157 A1 * 6/2016 Hochman .............. A61G 13/10 5/600
2017/0014287 A1 * 1/2017 Chung ................. A61G 7/1015
2017/0258657 A1 * 9/2017 Llanes ................. A61G 7/1026
2019/0060149 A1 * 2/2019 Patmore ............... A61G 7/1046

* cited by examiner

PATIENT SLIDER DEVICE

CROSS-REFERENCE TO RELATED APPLICATION

The present application is a continuation of U.S. patent application Ser. No. 16/405,880 filed on May 7, 2019, entitled “Patient Slider Device”, which claims priority from U.S. Pat. Prov. App. Ser. No. 62/668,196, filed May 7, 2018, entitled “Patient Slider Device”, the entire specification of which is hereby incorporated by reference in its entirety.

BACKGROUND OF THE DISCLOSURE

1. Field of the Disclosure

The disclosure relates in general to medical equipment, and more particularly, to a patient slider device which is structurally configured to aid in the movement of a patient between adjacent beds by pulling a bed sheet that underlies the patient.

2. Background Art

The use of patient transfer devices is known in the art. Typically, and often in a hospital setting, patients are transferred between two surfaces, such as hospital beds or the like. The beds are positioned in a side by side orientation and the operator(s) stand on one side of the second bed opposite the patient that is lying on the first bed. The operator then reaches over the first bed and pulls the sheet underlying the patient, so that the sheet and the patient traverse from the first bed surface to the second bed surface.

Understandably, such a movement may be difficult. First, the operator(s) needs to reach the sheet and be able to pull the sheet across the second bed. Second, the operator(s) needs to have sufficient strength and coordination to pull the sheet and the patient across the first bed and onto the second bed. Third, the operator(s) need to minimize discomfort, injury and/or disruption to the patient.

As the movement of the patient is fraught with potential for injury to both the patient and the operator(s), a number of devices have been developed to assist, automate, and/or manage the movement of a patient between adjacent bed surfaces.

SUMMARY OF THE DISCLOSURE

A patient slider device comprising a frame, a bed engagement assembly and a patient pulling assembly. The frame has a base and an elongated body extending from the base. The elongated body has a lower end and an upper end. The bed engagement assembly is structurally configured to engage a bed, to, in turn, maintain the frame in an operable position. The patient pulling assembly includes a winch assembly and a sheet engaging clamp assembly. A winding strap extends between the winch assembly and the sheet clamp assembly and is movable relative to the frame by the winch assembly.

In some configurations, the winch assembly includes a drum and a motor positioned within a housing. The housing is positioned proximate the lower end of the elongated body.

In some configurations, the winding strap exits the frame proximate the upper end thereof.

In some configurations, the winch assembly further includes a slack take-up system within the elongated body of the frame.

In some configurations, the slack take-up system includes an idler pulley and a spring coupled to the idler pulley and to the frame. The idler pulley is configured to travel between the lower end and the upper end of the elongated body of the frame.

In some configurations, the spring comprises one of a helical spring and a constant force spring.

In some configurations, a bed engagement assembly further includes a bumper and an adjustment mechanism. The adjustment mechanism is structurally configured to adjust the position of the bumper between the lower end and the upper end of the frame.

In some configurations, the bumper is slidably movable along the frame between the lower end and the upper end of the frame.

In some configurations, the adjustment mechanism includes a first side vertical adjustment, a second side vertical adjustment and a support member. The first side vertical adjustment has a first interfacing coupling coupled to the frame and a first mating coupling slidably movable along the first interfacing coupling. The second side vertical adjustment having a second interfacing coupling coupled to the frame and a second mating coupling slidably movable along the second interfacing coupling. The support member has a first side arm coupled to the bumper and to the first mating coupling, and a second side arm coupled to the bumper and the second mating coupling.

In some configurations, the frame has a first side and a second side opposite the first side, and with a bed side extending therebetween. The first side vertical adjustment extending along the first side between the lower end and the upper end of the frame. The second side vertical adjustment extending along the second side between the lower end and the upper end of the frame, with the bumper extending therebetween and across the bed side, while being spaced apart from the bed side.

In some configurations, the adjustment mechanism further includes a locking assembly structurally configured to lock the position of the bumper relative to the frame between the lower end and the upper end of the frame.

In some configurations, the patient pulling assembly further includes a winch control system structurally configured to retract the winding strap toward the frame.

In some configurations, the winch control system includes a remote movable away from the frame.

In some configurations, the patient slider device further includes a sheet engaging clamp assembly that has a base member and a locking member. The locking member is coupled to the winding strap and to the base member. A sheet is releasably clampable between the base member and the locking member.

In some configurations, the base member comprises an elongated rod having a first side axial valley at one end thereof, and a second side axial valley at the other end thereof. The locking member comprises a transverse strap having a first adjustable strap loop and a second adjustable strap loop. The first adjustable strap loop is positionable over the first side axial valley to clamp a sheet therebetween. The second adjustable strap loop is positionable over the second side axial valley to clamp the sheet therebetween.

In some configurations, the locking member is one of fixedly coupled to the winding strap and releasably coupled to the winding strap.

In some configurations, the first side axial valley and the second side axial valley are each formed by a pair of spheres spaced apart from each other.

In another aspect of the disclosure, the disclosure is directed to a sheet engaging clamp assembly having a base member and a locking member. The base member has an elongated rod having a first side axial valley at one end thereof, and a second side axial valley at the other end thereof. The locking member has a transverse strap having a first adjustable strap loop and a second adjustable strap loop. The first adjustable strap loop is positionable over the first side axial valley to clamp a sheet therebetween, and the second adjustable strap loop is positionable over the second side axial valley to clamp the sheet therebetween.

In another aspect of the disclosure, the disclosure is directed to a method of sliding a patient from a first surface to a second surface adjacent to the first surface, with a patient positioned on a sheet covering the first surface, using a patient slider device and comprising the steps of: providing a sheet engaging clamp; clamping a sheet upon which a patient is positioned to the sheet engaging clamp; positioning the patient slider device adjacent the second surface opposite from the first surface; extending the winding strap from the frame; coupling the sheet engaging clamp to the winding strap; retracting the winding strap with the winch assembly; pulling the sheet toward the frame, to, in turn, slide a patient to the second surface.

In some configurations, the patient slider device further includes a winch control system that comprises a remote that controls the winch assembly, the method further comprising the step of moving the remote away from the frame of the patient slider device prior to the step of retracting the winding strap with the winch assembly.

BRIEF DESCRIPTION OF THE DRAWINGS

The disclosure will now be described with reference to the drawings wherein.

DETAILED DESCRIPTION OF THE DISCLOSURE

Figure 1:
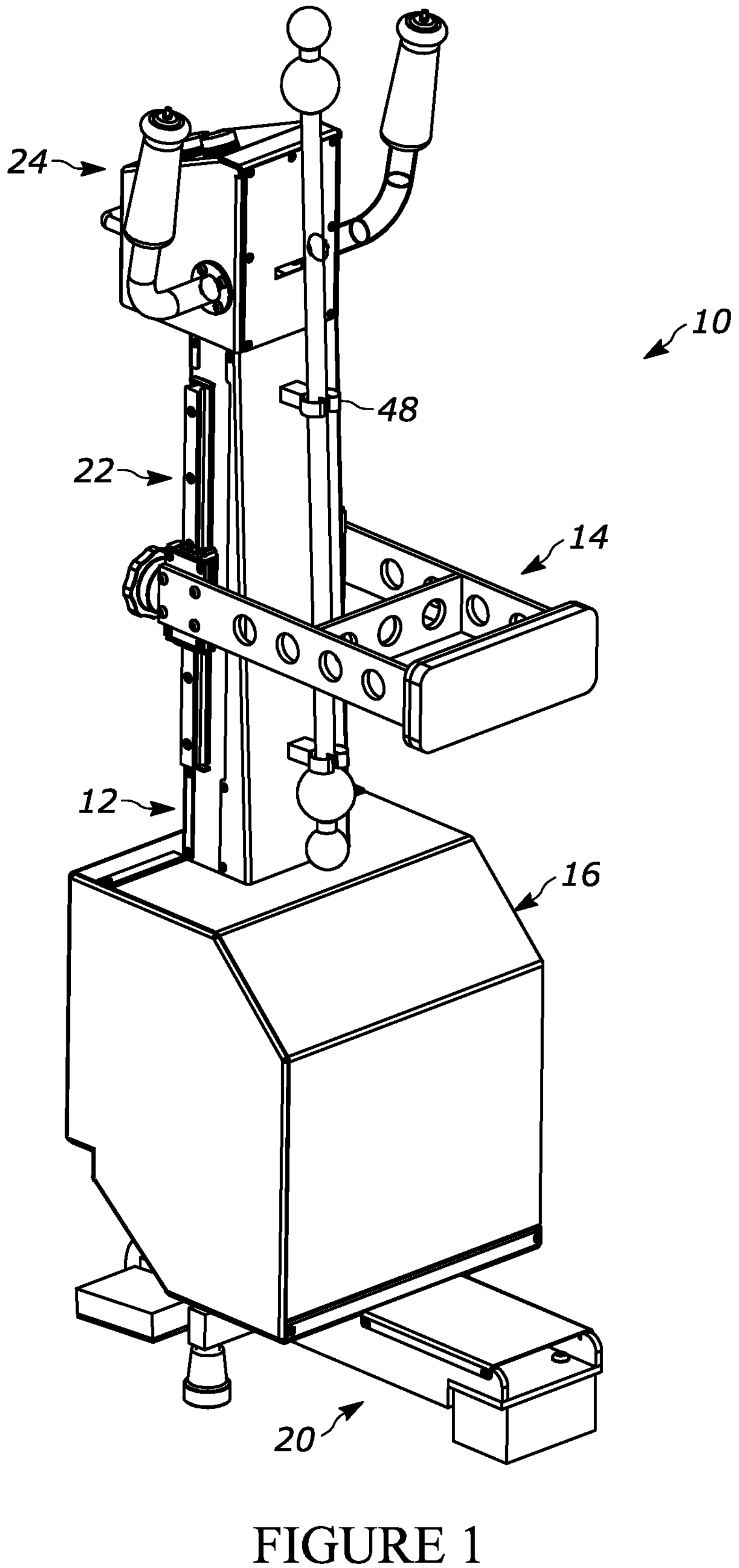
FIG. 1 of the drawings is a front, side perspective view of the patient slider device of the present disclosure.

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIGS. 1 through 4, the patient slider device is shown generally at 10. The patient slider device, as will be understood, is typically utilized in a hospital or medical center to transfer a patient from one hospital bed to another hospital bed. In such an environment, it is desirable to have such a procedure accomplished by a single practitioner or caregiver (i.e., operator). It will be understood that the patient slider device is configured for use in association with a number of different types and configurations of beds and other surfaces (i.e., hospital beds, surgical beds and surfaces, adjustable beds, testing equipment, stretchers, among others), and with patients of different sizes and with different ailments. The device as described herein is not limited to use in any particular environment, or with any particular types of patient surfaces, and the reference to a hospital and/or medical facility, as well as to hospital beds is solely exemplary.

With reference to FIGS. 1 through 4, one configuration of the patient slider device 10 comprises frame 12, bed engagement assembly 14, and patient pulling assembly 16. The frame 12 includes base 20, elongated body 22 and grasping handle assembly 24. Generally, the frame is sized so that the base can support the device, and maintain the device in an upright configuration, with the elongated body extending above the level of the patient surface of the hospital bed. In the configuration shown, the frame 12 has a height that is between 40 inches and 60 inches, while other dimensions are contemplated.

With additional reference to FIGS. 2-5, the base 20 extends between rear end 30 and front end 31. In the configuration shown, the base is a substantially rectangular member having a length that is greater than the width, while other configurations are contemplated. Ground supports 32 extend from the base to interface with the ground surface. In particular, and with further reference to FIG. 5, the ground supports include foot member 40, first side leg 42 and second side leg 44. The foot member 40 comprises a transverse member having an engagement surface. The first side leg extends to one side of the base with the second side leg extending on the opposite side of the base spaced apart from the foot member. In the configuration shown, the first and second side legs are spaced apart from the rear end of the base as well, while remaining closer to the rear end than to the front end.

The wheel assembly 34 comprises a transverse roller 36 that extends outwardly from the rear end of the base and rotates about axle 38. It will be understood that the first and second side legs are spaced apart from the rear end, and the transverse roller to facilitate for tilting of the frame onto the wheel assembly 34. In the configuration shown, the ground supports extend from the base beyond a lower surface of the transverse roller so that when the patient slider device is in an operable configuration on a floor or other surface, the device rests on the first and second side legs with the transverse roller spaced apart from the floor or other surface.

Figure 16:
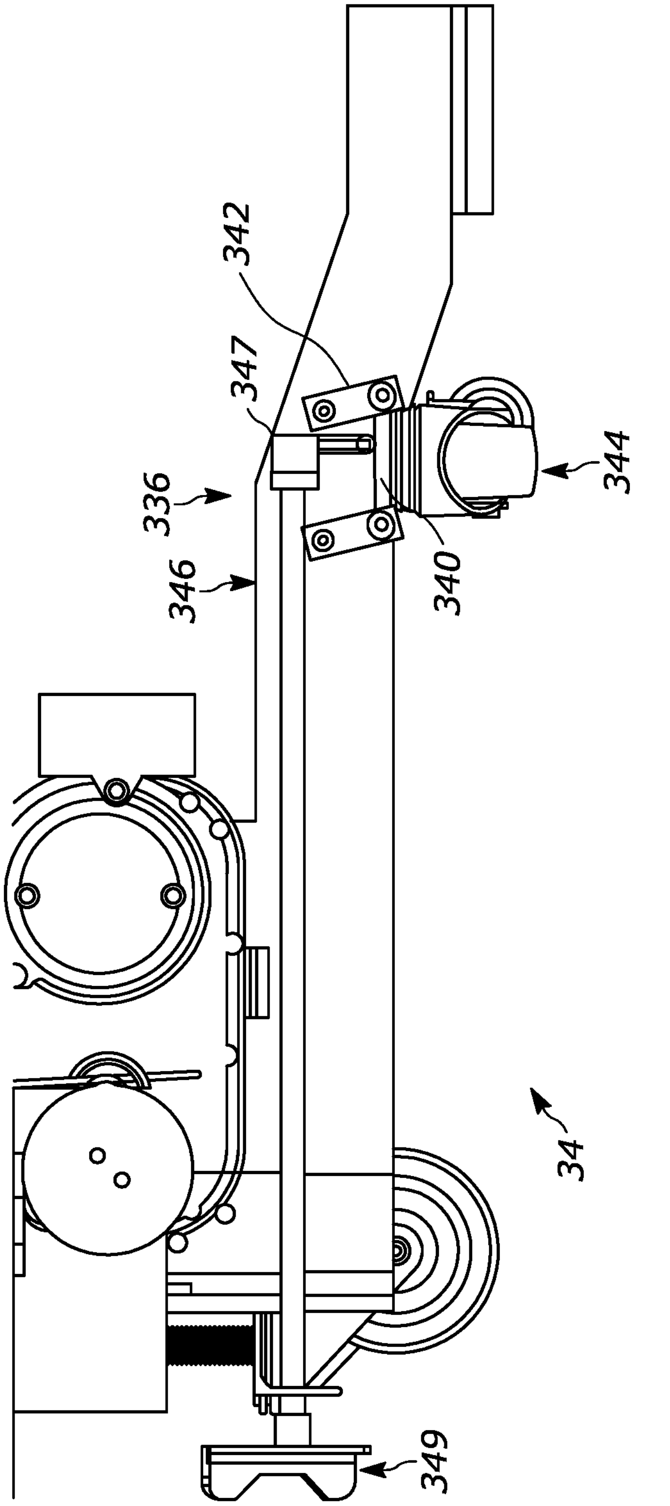
FIG. 16 of the drawings is a partial cross-sectional view of a configuration of the patient slider device showing the wheel assembly thereof.
Figure 17:
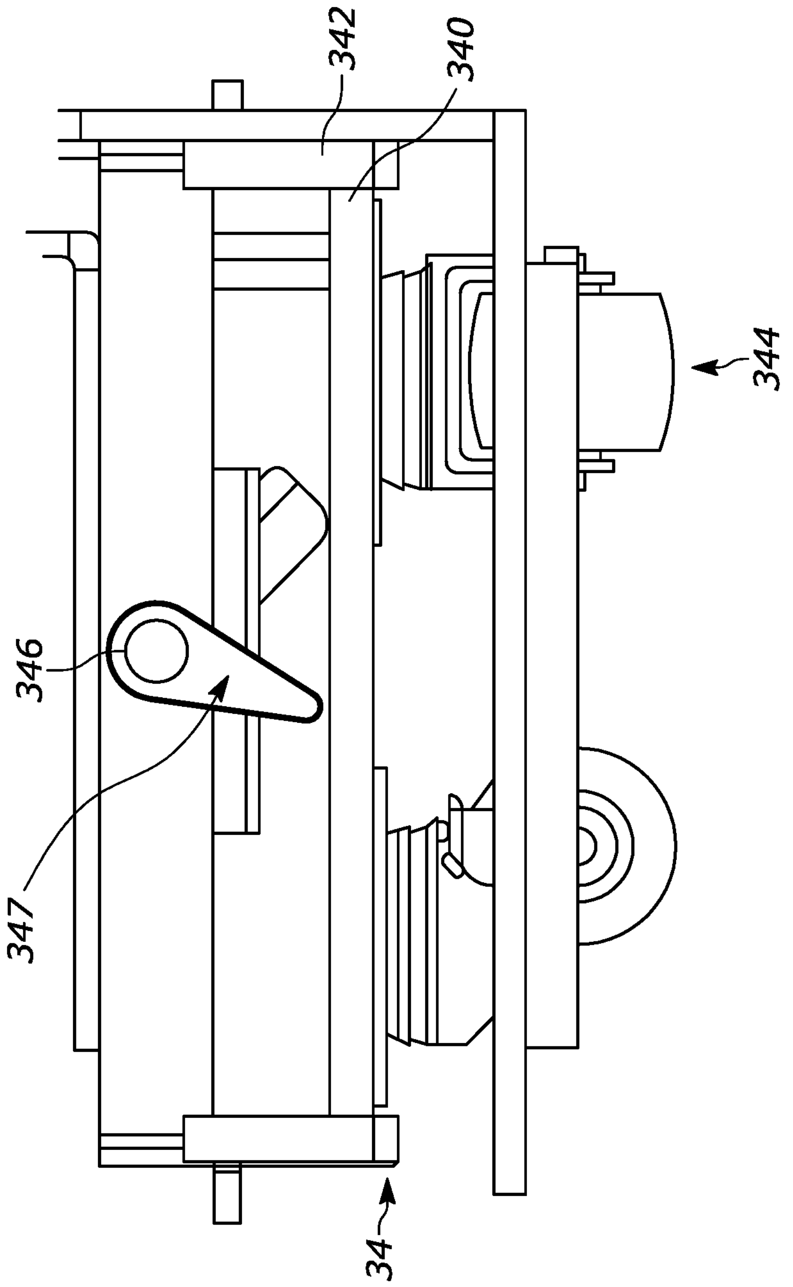
FIG. 17 of the drawings is a partial cross-sectional view of the configuration of the patient slider device of FIG. 16.
Figure 18A:
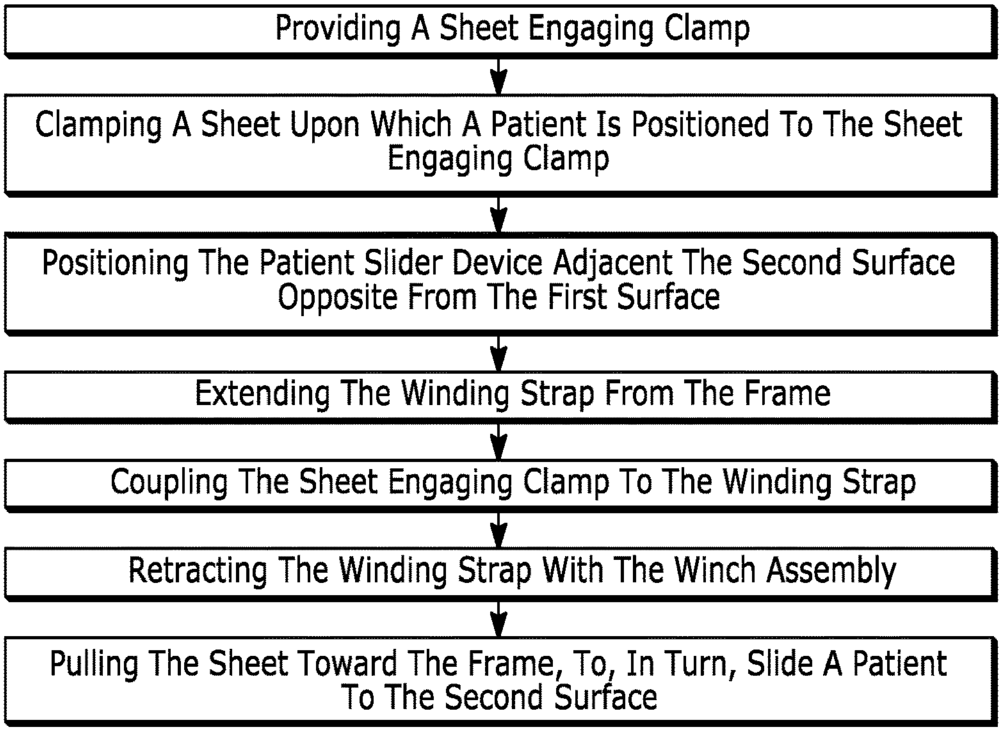
FIGS. 18*a* and 18*b* of the drawings are a methods of sliding a patient from a first surface to a second surface adjacent to the first surface, with a patient positioned on a sheet covering the first surface, using the patient slider device.
Figure 18B:
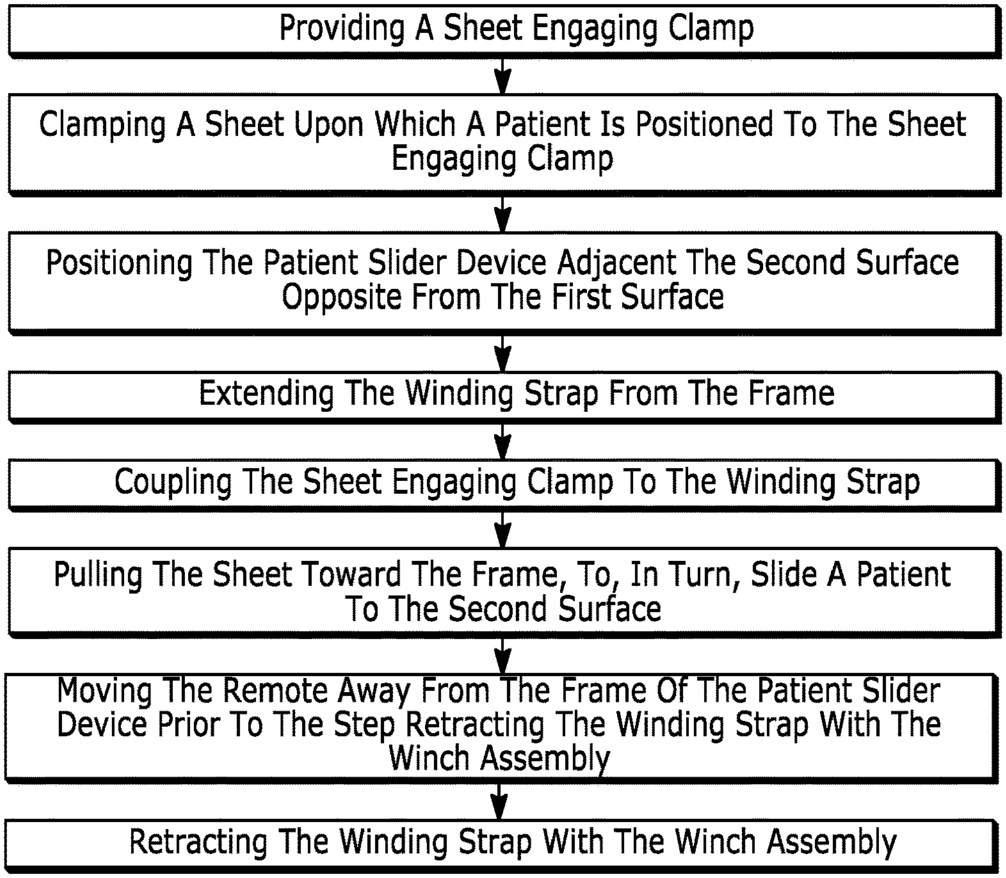

It will be understood that in other configurations, both the ground support and the wheel assembly may have another configuration. For example, the ground supports may comprise extendable members that are actuated or otherwise moved to raise the device off the wheels, and to support the same. For example, in the configuration of FIGS. 16 and 17, the wheel assembly 34 may include a front wheel assembly 336. The front wheel assembly 336 includes mounting subframe 340, translating linkage 342, wheel members 344 and control lever 346. The mounting subframe 340 is coupled to other portions of the frame 12, and configured to be movable relative thereto through the translating linkage 342 (which includes, in the configuration shown, four separate linkages coupled at one end to the mounting subframe and at another end to the base or elongated body. The wheel members 344 comprise swivel casters in the configuration shown, arranged in a spaced apart configuration. The control lever 346 is rotatably coupled to the base or elongated body and includes an articulating cam 347 at one end thereof and a foot actuator 349 at the other end thereof. As the control lever 346 is actuated by the foot actuator 349 so as to rotate in a first or second direction, the articulating cam 347 outwardly pushes the mounting subframe to drive the wheel members into the ground (and to, in turn, lift the structure away from the ground), or, allows the wheels to collapse and retract thereby allowing the foot member to contact the ground, and to have the foot member support the device. It will be understood that, in use, as a patient is being transferred, the weight of the unit and the forces are directed in such a manner that the foot member is directed into the ground.

Figure 14:
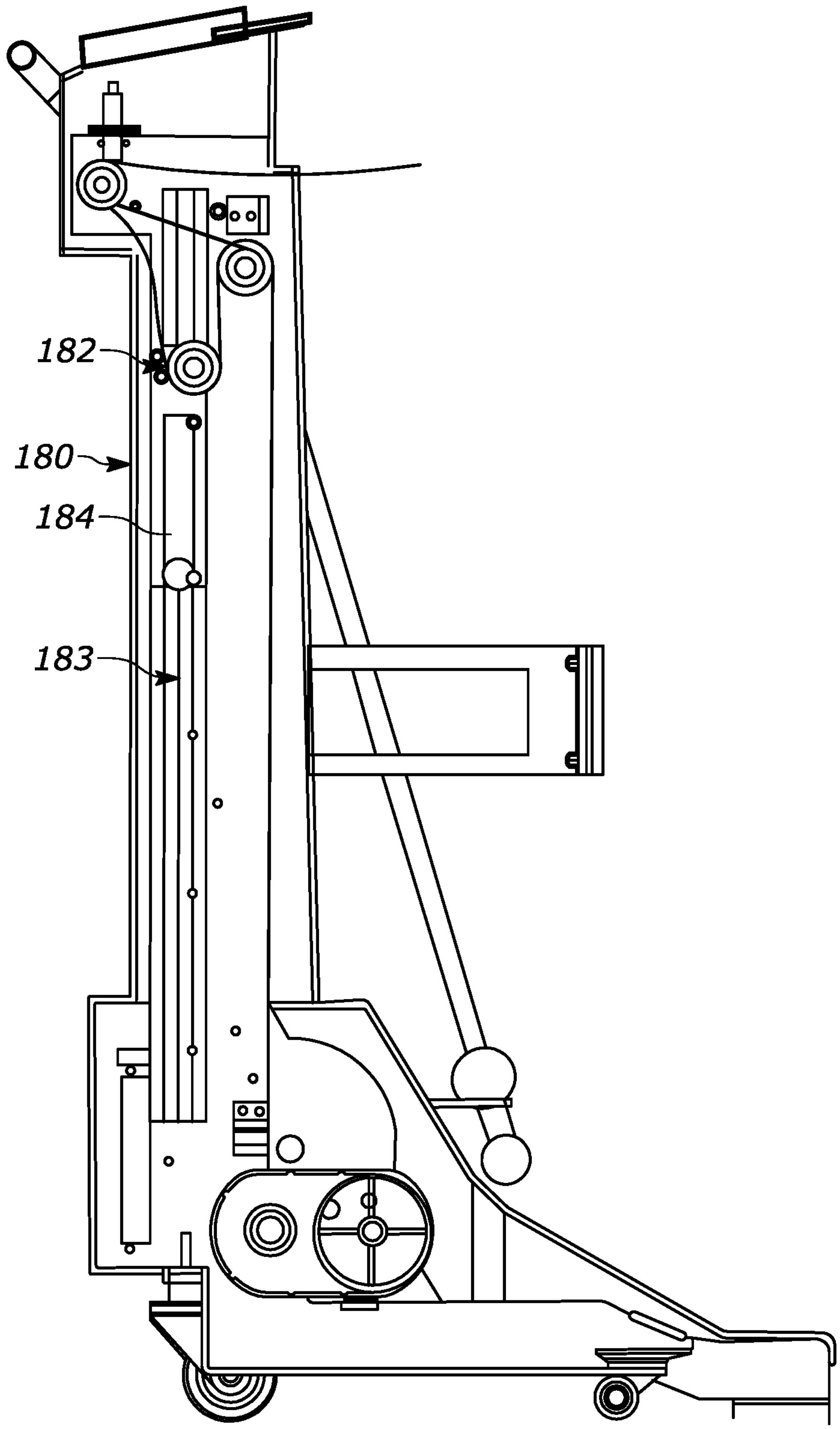
FIG. 14 of the drawings is a cross-sectional view of the configuration of the patient slider device of the present disclosure.
Figure 15:
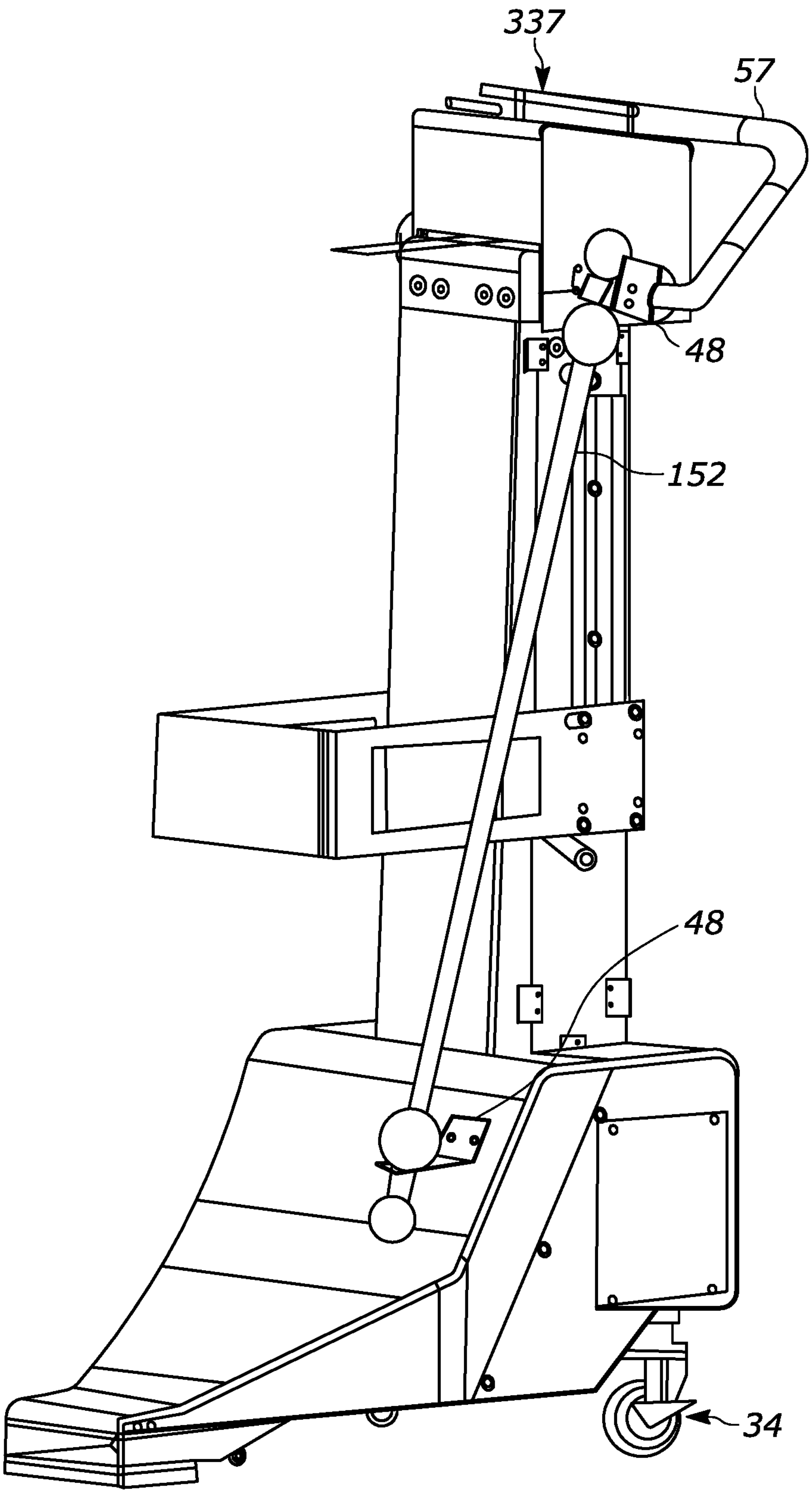
FIG. 15 of the drawings is a perspective view of the configuration of the patient slider device of FIG. 14.

In other configurations, a wheel assembly may be omitted, or the transverse roller may be replaced with a plurality of separate wheels (such as is shown in FIGS. 14 and 15, which, for example, and not to be deemed limiting, disclose swiveling casters), or a combination of rollers and wheels. In still other configurations, the device may be of a weight that allows for carrying, or may be configured for coupling to a hospital bed or the like so that moving of the device is accomplished through movement of a hospital bed or the like. In still other configurations, the device may be coupled to another structure which provides for the moving from one location to another, and the device itself may lack any motive structures.

Figure 6:
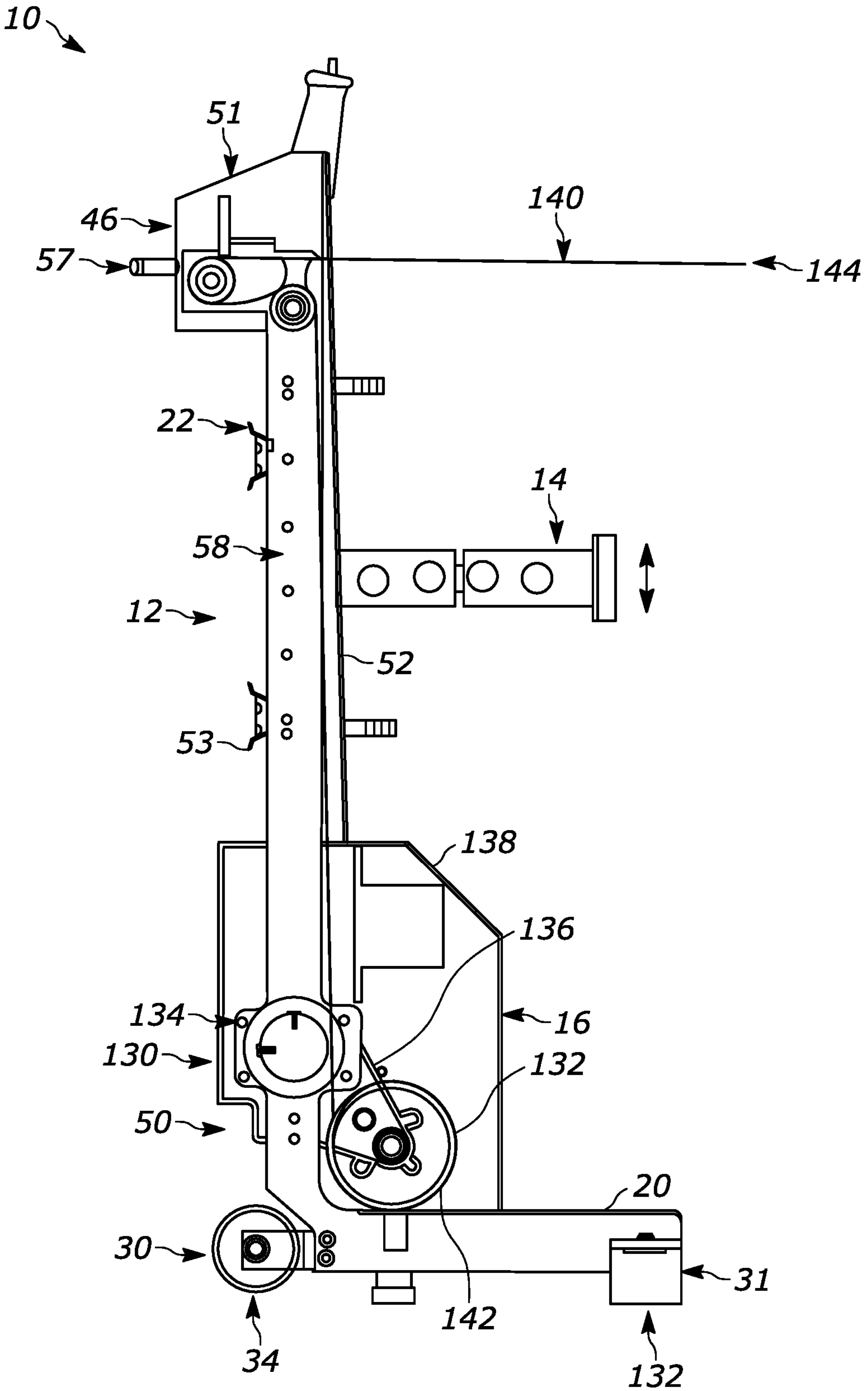
FIG. 6 of the drawings is a cross-sectional view of the patient slider device of the present disclosure, showing, in particular, the internal configuration of the frame, and the configuration of the winch assembly of the patient pulling assembly, taken generally about lines 6-6 of FIG. 5.

With continuing reference to FIGS. 1 through 4, along with FIG. 6, elongated body 22 extends from the base 20 in a generally upward direction. In the configuration shown, the elongated body extends generally vertically emanating near or at the rear end of the base. The elongated body 22 extends from lower end 50 to upper end 51, and is defined by a bed side 52, an operator side 53, a first side 55, and a second side 56. The different sides cooperatively define an internal channel 58 (through which the winding strap extends between the sheet engaging clamp assembly 150 (FIG. 9) and the winch 130 and typically exits the frame proximate the upper end and generally above the bed engagement bumper). In the configuration shown, the elongated body has a width that is greater than its depth, with the bed side being oblique to the operator side, while the first side and the second side are substantially parallel to each other. In the configuration shown, further, the upper end has an upper rearward extension 46, which, in part defines a control panel, and which has provisions for handle 57 which provides manipulation of the device and grasping thereof while rolling. Of course, variations in the configuration are contemplated.

It is contemplated that the elongated body may be formed cooperatively with the base so that components may extend and form portions of each. In some configurations, the elongated body is cooperatively formed with the housing 138 of the winch assembly 130. Additionally, in some configurations, the base and the elongated body may comprise a frame structure of beams and cross supports, with panels enclosing or covering the same. While it is contemplated that much of the structure is formed from metal components, polymer based structures as well as composites are contemplated for use.

Figure 2:
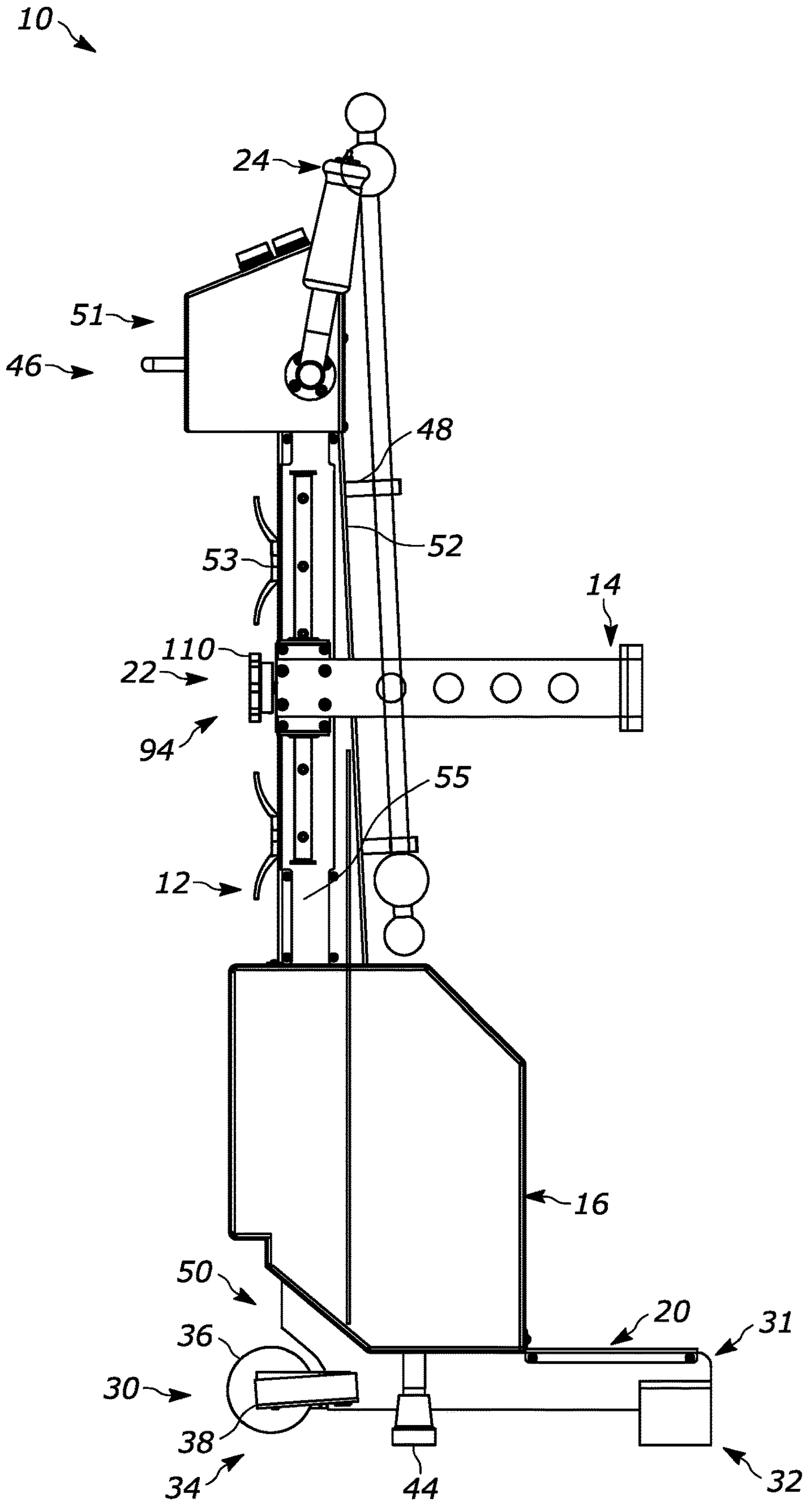
FIG. 2 of the drawings is a side elevational view of the patient slider device of the present disclosure.
Figure 3:
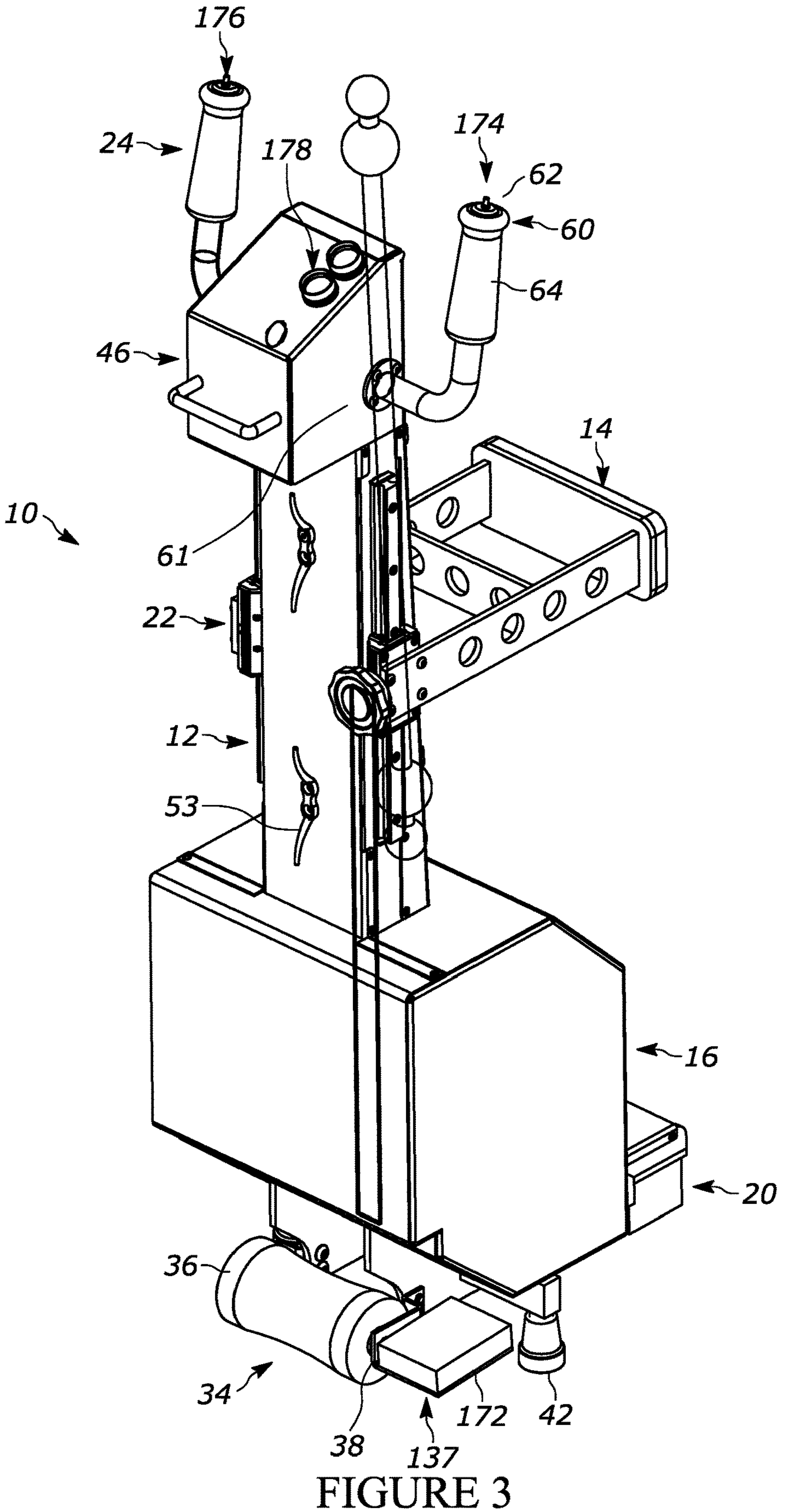
FIG. 3 of the drawings is a back, side perspective view of the patient slider device of the present disclosure.
Figure 4:
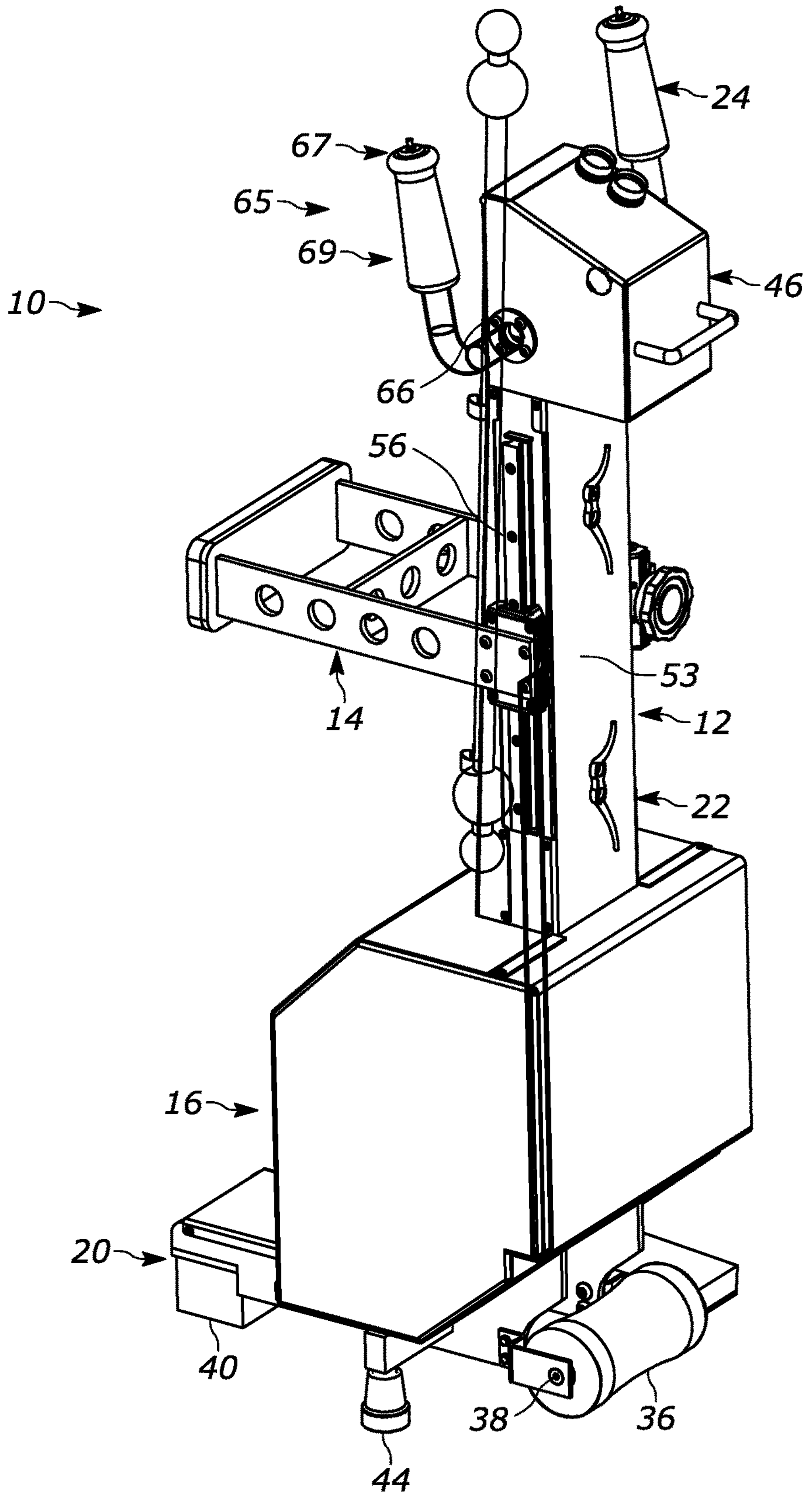
FIG. 4 of the drawings is a back, side perspective view of the patient slider device of the present disclosure.
Figure 5:
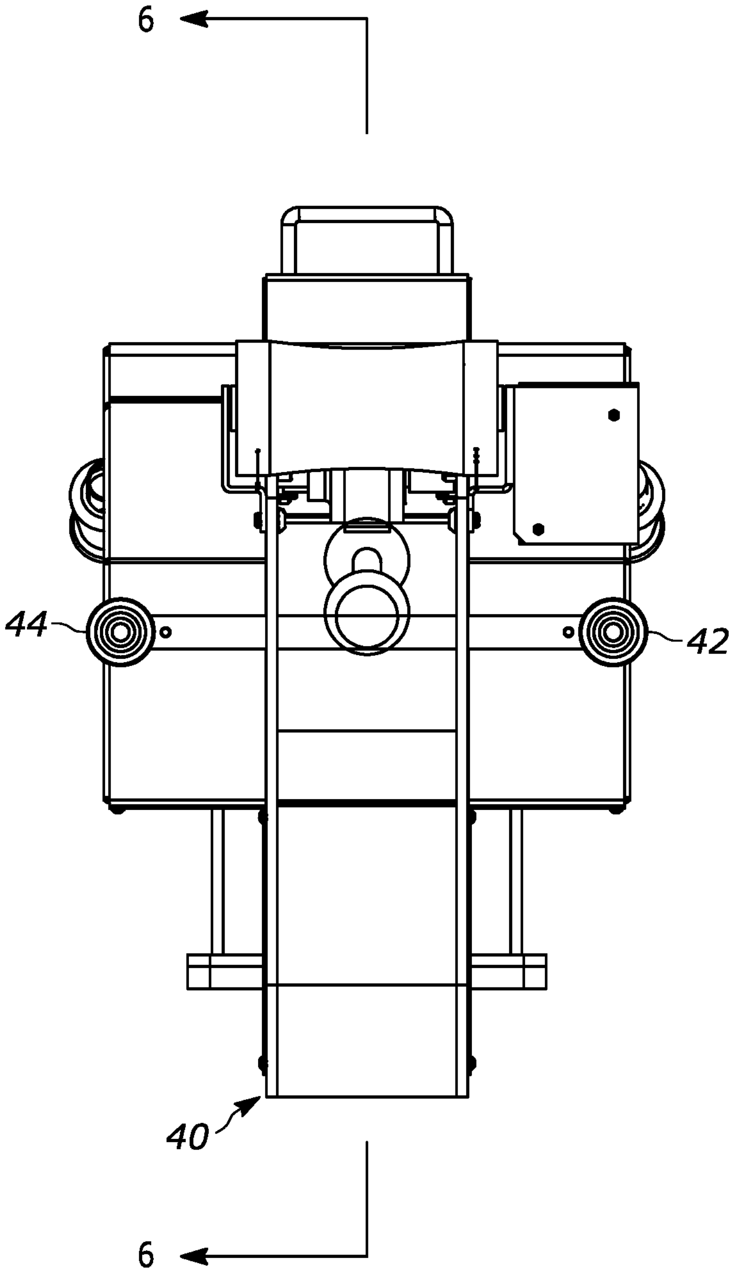
FIG. 5 of the drawings is a bottom plan view of the patient slider device of the present disclosure.

The grasping handle assembly 24 is shown in FIGS. 2, 3 and 4 as comprising first side handle 60 and second side handle 65. The first side handle 60 extends from the first side 55 of the elongated body proximate the upper end thereof, with the second side handle 65 extending from the second side of the elongated body, again, proximate the upper end thereof. In the configuration shown, the handles are mirror images of each other. The first side handle 60 includes a proximal end 61 that is at the interface with the elongated body and a distal end 62 which is spaced apart therefrom, so that the first side handle defines a grasping handle that has a partial U-shape that extends outwardly and the upwardly. An elastomeric or grippable structure may be placed over a grip portion 64, such as a neoprene, or a sleeve, to aid with gripping and comfort. The second side handle, being a substantial mirror image of the first side handle includes proximal end 66, distal end 67 and grip portion 69.

It is contemplated that the grasping handle may emanate from other portions of the elongated body. It is further contemplated that the grasping handles may be adjustable vertically or horizontally, or both relative to the elongated body, as opposed to being fixed in the configuration shown. Such adjustability may aid in instances where an operator is taller or shorter, or wherein other obstructions are present in the operative environment.

Figure 7:
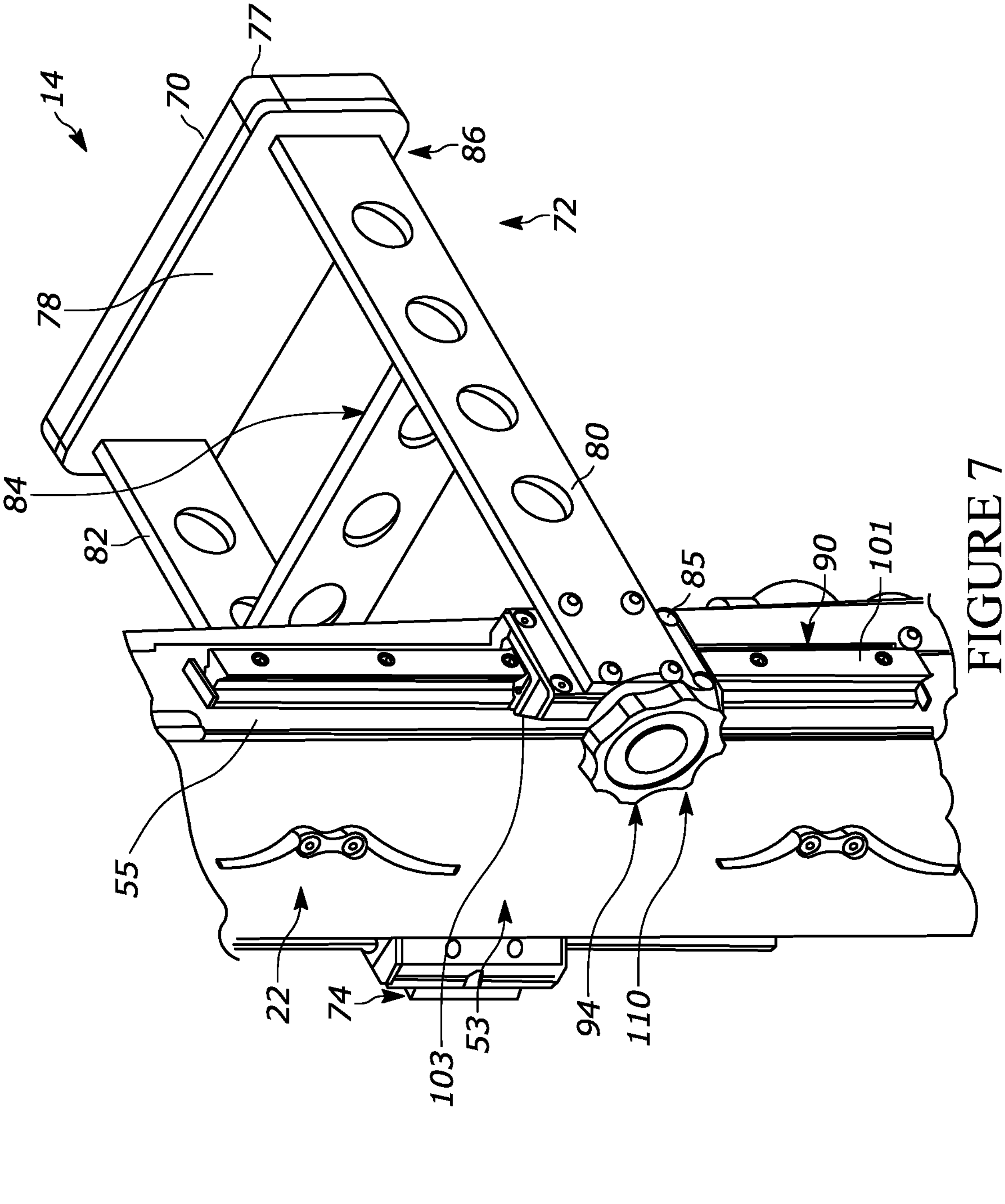
FIG. 7 of the drawings is a partial perspective view of the patient slider device of the present disclosure, showing, in particular, the bed engagement assembly.
Figure 8:
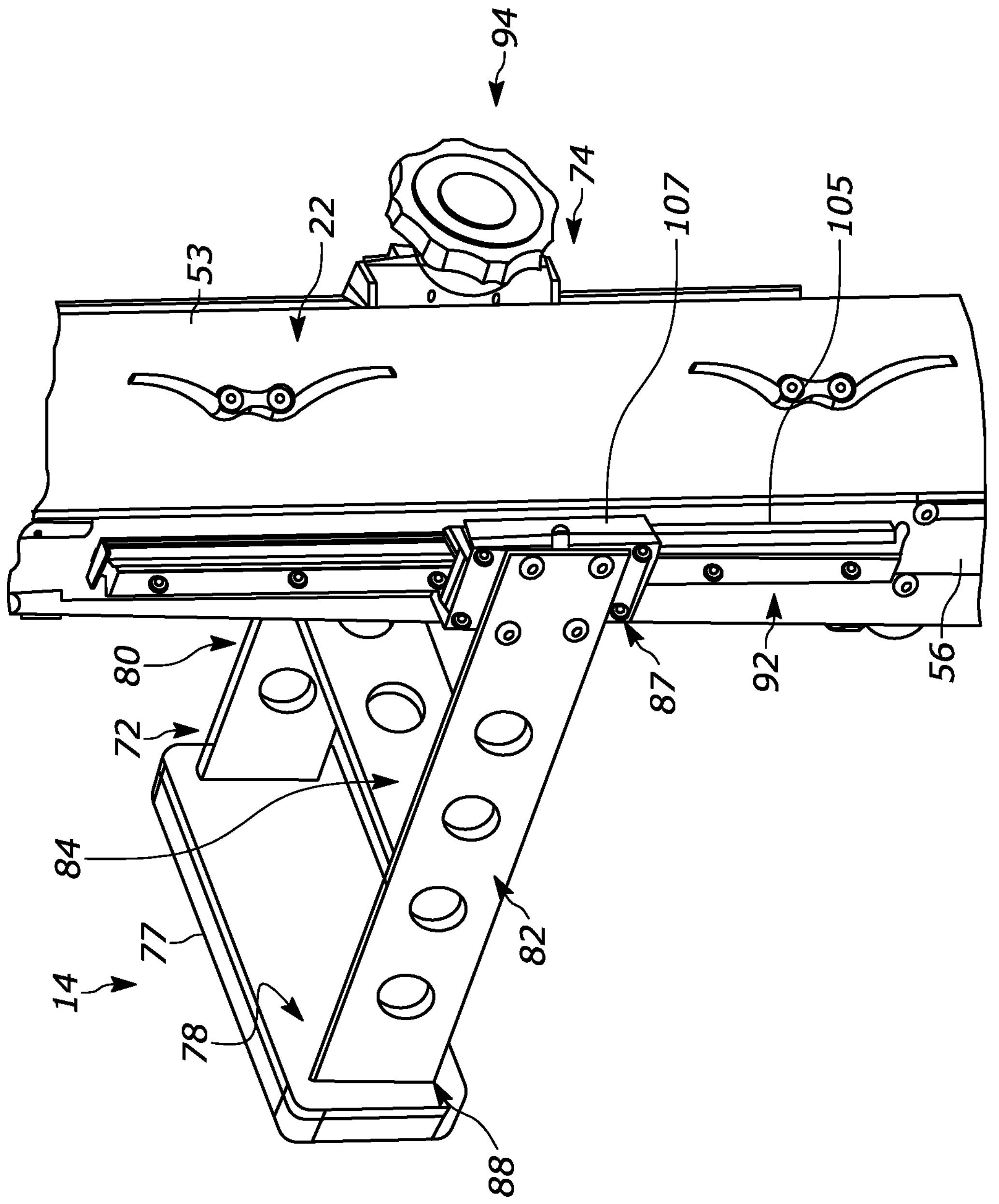
FIG. 8 of the drawings is a partial perspective view of the patient slider device of the present disclosure, showing, in particular, the beg engagement assembly.

The bed engagement assembly 14 is shown generally in FIGS. 1 through 4, and in greater detail in FIGS. 7 and 8 as comprising bumper 70, support member 72 and adjustment mechanism 74. The bumper 70 includes outward side 77 and back side 78. The bumper includes a resilient pad or the like that extends over the outward side thereof. Such a pad precludes damage to the bed against which the bumper is pressed when the device is in operation. In the configuration shown, the bumper is substantially planar with a width that is greater than the height thereof, with the bumper having a substantially rectangular configuration.

The support members 72 extend from the bumper 77 to the frame 12 and maintain the proper spacing therebetween. In the configuration shown, the support members comprise a first side arm 80, a second side arm 82 and a cross member 84. The first side arm and the second side arm extend from a distal end 86, 88, respectively on opposing sides of the bumper to a proximal end 85, 87 that overlies a respective one of the first side and the second side of the elongated body, spaced between the upper and lower end thereof. The cross member is generally substantially perpendicular to the first side arm and second side arm and extends therebetween. The cross member is substantially parallel to the bumper and spaced apart from the bumper so as to provide rigidity to the first and second side arms.

It will be understood that a number of other configurations for the support members are contemplated, such as a centrally located arm that extends to a bumper, as well as a bumper that is coupled to other structures beyond the sides of the elongated body.

The adjustment mechanism 74 includes first side vertical adjustment 90, second side vertical adjustment 92 and locking assembly 94. The first side vertical adjustment 90 includes first interfacing coupling which is mounted on the first side of the frame, and first mating coupling 103 which is mounted at the proximal end of the first side arm 80. The second side vertical adjustment 92 includes second interfacing coupling 105 positioned on the second side of the elongated body and second mating coupling 107 positioned on the proximal end of the second side arm 82.

In the configuration shown, the first interfacing coupling 101 and the first mating coupling 103 slidably interface in the form of a rail and a mating slot, such that the first mating coupling is slidably positionable along the first interfacing coupling in a linear fashion. In the same manner, the second interfacing coupling 105 and the second mating coupling 107 slidably interface in the form of a rail and a mating slot, such that the second mating coupling is slidably positionable along the second interfacing coupling in a linear fashion. In the configuration shown, the first and second side vertical adjustments allow for an up and down positioning of the support members, and in turn the bumper member relative to the frame 12, between a lower position and an upper position. It is contemplated that in other configurations, the vertical adjustments allow for substantially vertical travel that is inclined so that the bumper also experiences some horizontal travel component. For example, the vertical adjustment may be inclined at +/−10°-15° with respect to the vertical.

In other configurations, the first and second side vertical adjustment may comprise a slidable configuration that is different than the rail and mating slot, while providing linear movement of the bumper. For example, in other configurations, a geared assembly is contemplated, or, an assembly that is aided by hydraulic cylinders and the like. In some configurations, the adjustment mechanism may be centrally located instead of on opposite sides of the elongated body. In still other configurations, the adjustment mechanism may lie at least partially within the elongated body or other structures of the frame.

The locking assembly 94 is shown in FIG. 7 as comprising a threaded bolt having handle 110 which is threadedly engageable with the threaded opening (not shown) of the first side mating coupling 103. When threaded into the threaded opening, the threaded bolt engages the first interfacing coupling and precludes slidable movement between the first interfacing coupling and the first mating coupling to effectively lock the same. In other configurations, a lever locking mechanism may be utilized, wherein locking is achieved through the rotation of a lever which, for example, rotates a cam to apply force on to the interfacing coupling to preclude movement between the interfacing coupling and the mating coupling. In other configurations, instead of an infinitely lockable configuration between the upper and lower end of travel of the bumper, a plurality of set locking openings may be configured to engage with the threaded bolt or a pin such that the bumper can be locked at discrete positions along the range of travel.

Figure 9:
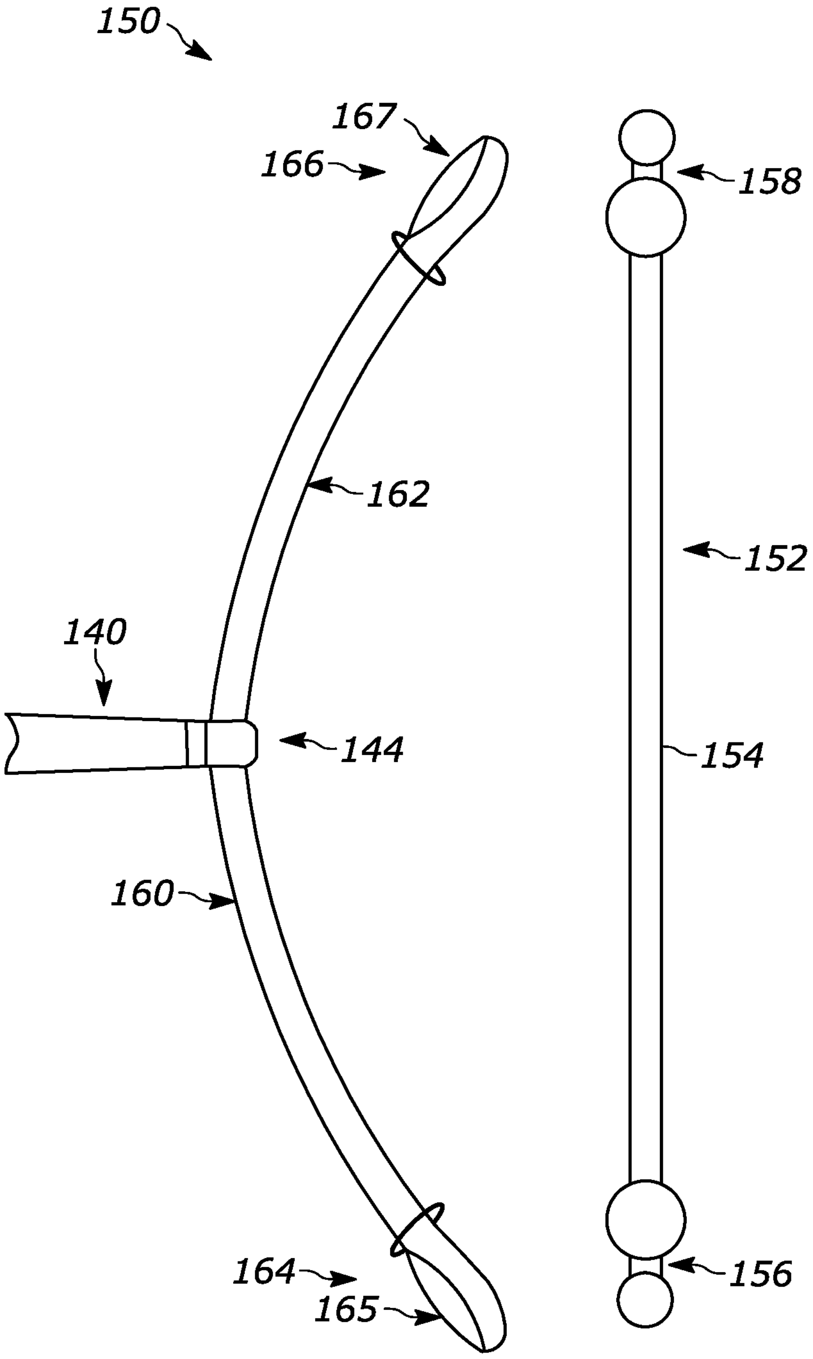
FIG. 9 of the drawings is a top plan view of the sheet engaging clamp assembly.
Figure 9B:
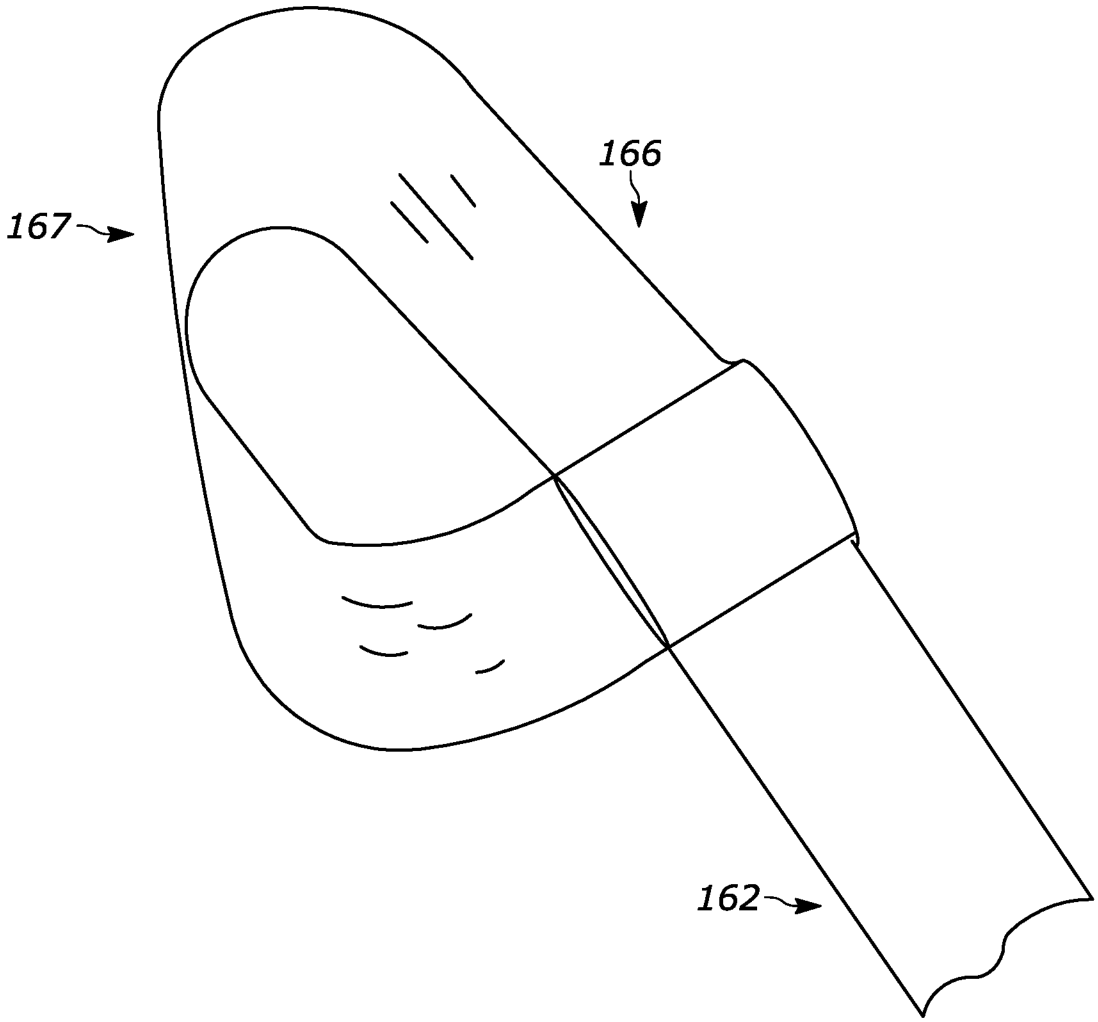
FIG. 9*b* of the drawings is a partial side view of the locking member, showing, in particular, the second adjustable strap loop.

With reference to FIG. 6 and FIGS. 9 and 9*b*, the patient pulling assembly 16 comprises winch assembly 130, winding strap 140 and sheet engaging clamp assembly 150. The winch assembly 130 comprises drum 132, motor 134 having transmission 136, and winch control system 137 (FIG. 3). The drum, transmission and motor of the winch assembly 130 are maintained within the housing 138. Generally, the motor is powered by AC current that is obtained through a power cord that extends out of the housing 138 and can be wound to the operator side 53 of the elongated body. In other configurations, the device may be self-contained by incorporating a batter within the housing 138. In the configuration shown in FIGS. 14 and 15, the power cord may be coupled to a retraction configuration so as to be retractable into the internal portion of the base.

With reference to FIG. 3, the winch control system 137 provides the user with the ability to power off and on the device, as well as to actuate the motor. In the configuration shown, the winch control system 137 includes foot switch 172, first handle switch 174, second handle switch 176 and directional switch 178. In some configurations, a reset button may also be incorporated for purposes of safety (i.e., when the patient is pulled all the way across a limit switch is triggered and stops the device automatically). In the configuration shown, to minimize the possibility of the operator to be out of position, the operator must actuate each of the foot switch, the first handle switch, and the second handle switch simultaneously to actuate the motor (and the directional switch is oriented in a forward or reverse direction, as desired). Such a configuration insures that the operator is positioned on the operator side of the frame, and that the operator has engaged both of the handles. It is contemplated that in some configurations, the controls may be incorporated into a wired or wireless controller so that a second user (or the single user) can operate the device remotely (as set forth below). Additionally, in some configurations, the control system may include a sensor (such as, for example, a tilt sensor or accelerometer, among others) that can sense that the device is tipping over. For example, if a condition is sensed, such as tipping over, the system can stop the motor, to minimize the possibility of injury.

In another configuration, another sensor may be provided and associated with the control system which would further insure that the device is properly installed and configured prior to use. For example, the sensor could be located in the bumper, and the sensor could be triggered (i.e., depressed or otherwise triggered) when the device is properly positioned with the bumper pushed against the frame of the bed. Without proper positioning the sensor is not triggered, and, in turn, the motor cannot activate. In some configurations, multiple sensors may be provided so as to ensure that the device is both properly positioned and also properly aligned relative to the bed.

In another configuration, such as the configuration shown in FIGS. 14 and 15, the handle 57 can have a configuration that provides a larger loop member that extends over the sides of the elongated body at the upper end thereof.

Additionally, it is further contemplated that the winch control system may comprise a remote, such as remote 337 can be provided. In the configuration shown, the remote can be maintained on the upper end of the body and can be removed by the user so that the user can move around and assist with the patient moving (for example, at the head or the foot of the bed), while controlling the movement of the winch, the winding strap, and, in turn, the movement of the patient. In various configurations, it is contemplated that the remote may be wireless (tethered or untethered) or may be wired (for example, with a coiled cord or the like).

It will be understood that in some configurations, the system may be adapted to allow for a user to decouple the winch from the transmission and/or motor to allow a user to pull out the strap and manually unwind the winch.

Advantageously, the winch assembly, and in particular the housing 138, the drum and the motor are positioned proximate the lower end 50 of the frame proximate the base 20. With the weight of these components, the center of gravity of the entire device is proximate the lower end of the elongated body, enhancing stability. Furthermore, by utilizing a winch assembly, the device can pull even large patients with a compact device. Moreover, the winch assembly is positioned away from the operator, the patient and the patient surface of the bed. Furthermore, adjustment of the operable position of the bumper does not require movement of the winch assembly, rather, the winch assembly remains stationary at the lower end of the elongated body.

With continuing reference to FIG. 6, the winch assembly cooperates with the winding strap 140 that includes first end 142 associated with the drum, and a second end 144 opposite thereto. It is contemplated that the strap comprises a woven ballistic type nylon or the like. In some configurations, a polymer encased or coated strap can be utilized, which enhances durability and resistance to staining, snagging and the like. It is further contemplated that other straps may be utilized, including, for example, cables of varying material and construction as well as different types of ropes. It is further contemplated that the second end of the winding strap may be coupled directly or indirectly to the drum, and that the drum may have a seat belt type mechanism that allows for the movement of the winding strap without engagement of the motor to, for example, achieve initial positioning of the winding strap and the sheet engaging clamp assembly prior to actuation of the winch assembly, and, movement of the patient. It is further contemplated that multiple straps may be wound onto the same drum, or side by side drums that may or may not be matingly engaged. It will be understood that sensors, including but not limited to, limit switches or proximity sensors may be utilized to determine the position of the strap.

In the configuration shown, the path of the strap may extend generally horizontally the elongated body (and into the upper rearward extension 46) so as to be able to pull the sheet further horizontally while minimizing any imparting of a downward force on the sheet or the sheet engaging clamp assembly. It will be understood that the winding strap generally follows a path (directed, for example by surfaces, axles, and/or pulleys) within the internal channel of the elongated body from the upper end to the lower end thereof.

In some configurations, such as the configuration of FIG. 14 the path of the strap may further be controlled by slack take-up system 180, which is configured to preclude the strap (or to minimize) the strap from getting tangled inside the device. In one configuration, an idler pulley 182 is slidably mounted relative to the slide rail 183 (which may correspond to the interfacing coupling for the bumper adjustment mechanism). A spring, or other biasing member 184 is coupled to the frame (i.e., stationary to the slide rail) at one end and to the idler pulley at the other end. It will be understood that when there is relatively low resistance on the strap, the biasing member has sufficient strength to pull the idler pulley downward. When there is high resistance, the spring force of the biasing member is overcome and the idler pulley moves up eventually reaching the end of travel, and the strap can be pulled out of the device. Once the pulling force stops, the spring and the idler pulley can take up any slack in the system, as the spring pulls the idler pulley, thereby removing slack. The spring may comprise, for example, a helical spring, or in other configurations may comprise a constant force spring.

In another configuration, another slack take-up system is contemplated. In such a system, multiple opposing recoil springs may be utilized which push the strap out of the device when there is slack. In other configurations, the same may be accomplished through the use of a single recoil spring and an idler pulley opposing the single recoil spring. Still other slack take-up systems are contemplated.

Figure 10:
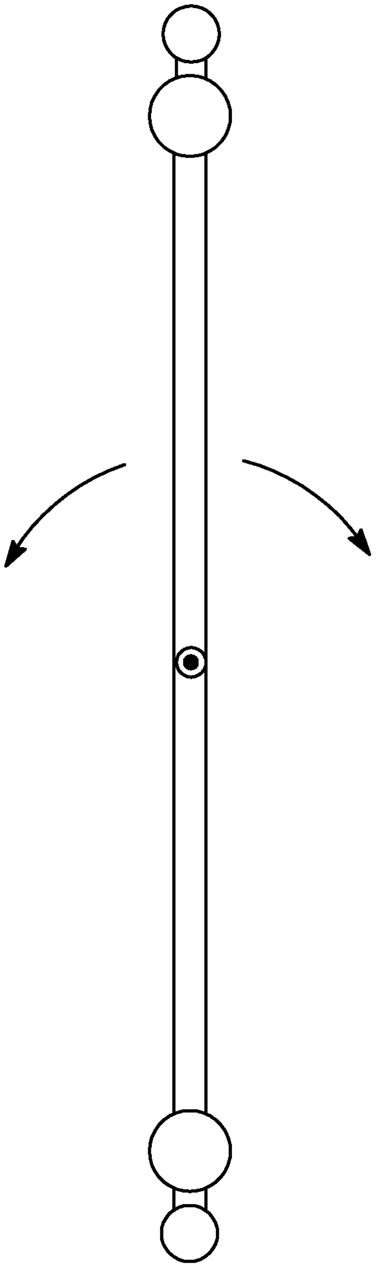
FIG. 10 of the drawings is a side elevational view of the base member of the sheet engaging clamp assembly.

The sheet engaging clamp assembly 150 is shown in FIG. 9 as comprising base member 152 and locking member 160. A number of different configurations are disclosed for the sheet engaging clamp assembly. One such configuration comprises a base member in the form of an elongated rod 154 including first side axial valley 156 and second axial valley 158. In the configuration shown, the elongated rod comprises a substantially elongated straight member of a round cross-sectional configuration. In other configurations, such as the configuration shown in FIG. 10, it is contemplated that the shape of the elongated rod may be altered, to, for example, accommodate and correspond to different configurations and positions of an adjustable patient bed. In other configurations, it is contemplated that the elongated rod may be of a shape that is curved, bent, or otherwise non-linear in one or more dimensions so as to accommodate various different desired orientations to facilitate patient moving.

The first side axial valley 156 is positioned on the first end of the elongated rod with the second side axial valley 158 positioned on the second side of the elongated rod. In the configuration shown, the axial valleys are mirror images of each other and each comprise a pair of spherical structures that are positioned relative to each other to define a valley therebetween. While the structures are shown to be substantially spherical, other shapes are contemplated, such as polygonal shapes, disks, among others. In other configurations, it is contemplated that a single continuous structure at each end of the elongated rod may define the first side and second side axial valleys. In the configuration shown, the two structures comprise spheres that are spaced apart from each other, with the outboard sphere being smaller than the inboard sphere.

The locking member 160, in such a configuration, comprises a transverse strap 162 having a first end 164 and a second end 166. An adjustable strap loop 165 is defined at the first end, and a second adjustable strap loop 167 is defined at the second end. In one configuration the strap is formed utilizing a substantially uniform woven polymer, the same as or similar to the winding strap. In the configuration of FIG. 9, the loop is formed with the aid of a metal, or polymer loop ring can be utilized, with the strap slidably movable therethrough to adjust the size and configuration of the strap loop. In the configuration of FIG. 9*b*, the strap, at each end, is folded over itself and a small is formed at the end through which the strap extends. As such, the loop at the end can be adjusted in size by moving the small loop.

In some configurations, the transverse strap may be fixedly coupled to the second end of the winding strap, or may be unitary therewith. In other configurations, the transverse strap may itself be releasably engageable with the winding strap, directly, or through an intermediate strap or other coupling, such as, for example a carabiner or the like. In other configurations, the transverse strap may further be slidably movable relative to the winding strap. For example, the second end of the winding strap may include a small loop through which the transverse strap is extended. The transverse strap is slidably movable relative to the second end of the winding strap.

It will be understood that a portion of a sheet can be extended over the ends of the elongated rod, so as to extend over the first and second side axial valleys. Once the sheet is positioned, the first and second adjustable strap loops can be directed over the ends of the elongated rod and into the axial valleys. When the strap is pulled, for example, by the winch assembly, the strap loops adjust in size and the essentially clamp the sheet between the strap loop and the first and second side axial valleys precluding separation of the sheet from the sheet engaging clamp assembly.

When not in use, the sheet engaging clamp assembly may be releasably attached to the frame. In the configuration shown, a pair of clasps, such as clasp 48, are disposed on the bed side of the elongated body. The clasps correspond to the configuration of the elongated rod, and the clasps can releasably retain the elongated rod when not in use. In the configuration shown in FIGS. 14 and 15, the clasps 48 may be positioned on the side of the elongated body and the base, so as to be offset and to one of the sides of the frame. Additionally, the clasps are configured so as to dispose the sheet engaging clamp assembly in an inclined orientation.

It will be understood that other configurations are contemplated. For example, in some configurations, multiple sheet engaging clamp assemblies may be utilized. With other configurations, a pair of base members 152 each having one or more corresponding locking member 160 may be utilized.

Figure 11:
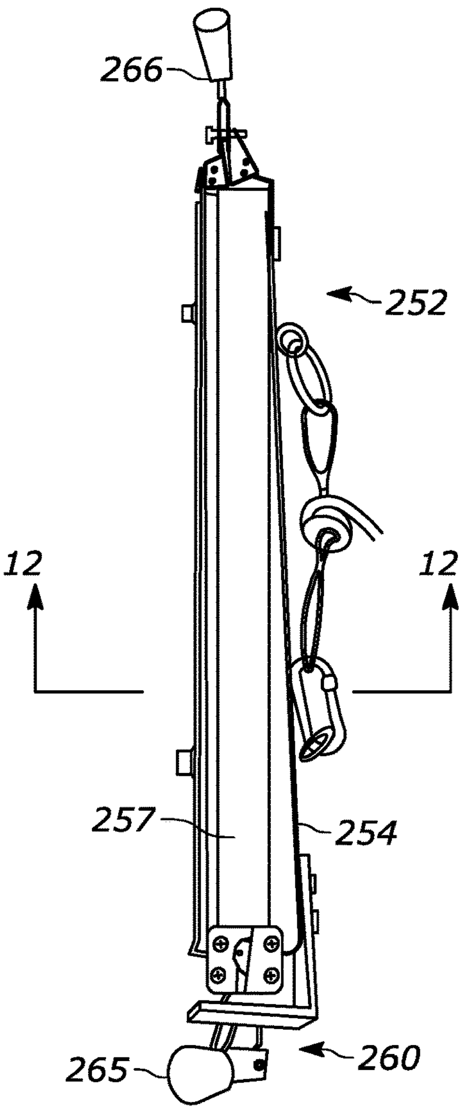
FIG. 11 of the drawings is a top plan view of another configuration of the sheet engaging clamp assembly.
Figure 12:
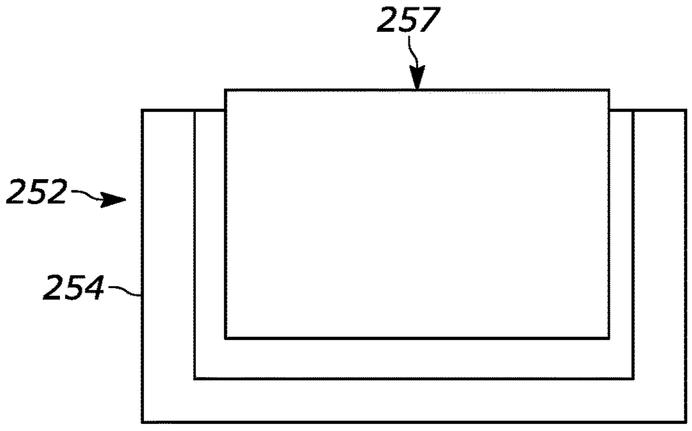
FIG. 12 of the drawings is a cross-sectional view of the configuration of the sheet engaging clamp assembly of FIG. 11 taken generally about lines 12-12 of FIG. 11.

A number of different sheet engaging clamp assemblies are contemplated for use, and use is not limited to the sheet engaging clamp assembly shown herein. For example, and as is shown in FIGS. 11 and 12, another configuration is shown. In such a configuration, the base member 252 comprises an elongated channel 254 (in the configuration shown, a U-channel) and a mating bar 257 positionable within the elongated channel 254. The elongated channel may be lined with an elastic pad so that the elastic is preferably elastically deformed upon insertion of the mating bar 257. The elongated channel includes a coupling for attachment to the second end of the winding strap directly or through other straps and/or couplings.

In such a configuration, the locking member 260 comprises a first lever lock 265 at one end of the elongated channel and a second lever lock 266 positioned at the second end of the elongated channel. The first and second lever locks force the mating bar into the elongated channel, so as to capture a sheet therebetween. The elastic pad minimizes damage to the sheet while enhancing the retention of the sheet within the base member.

Figure 13:
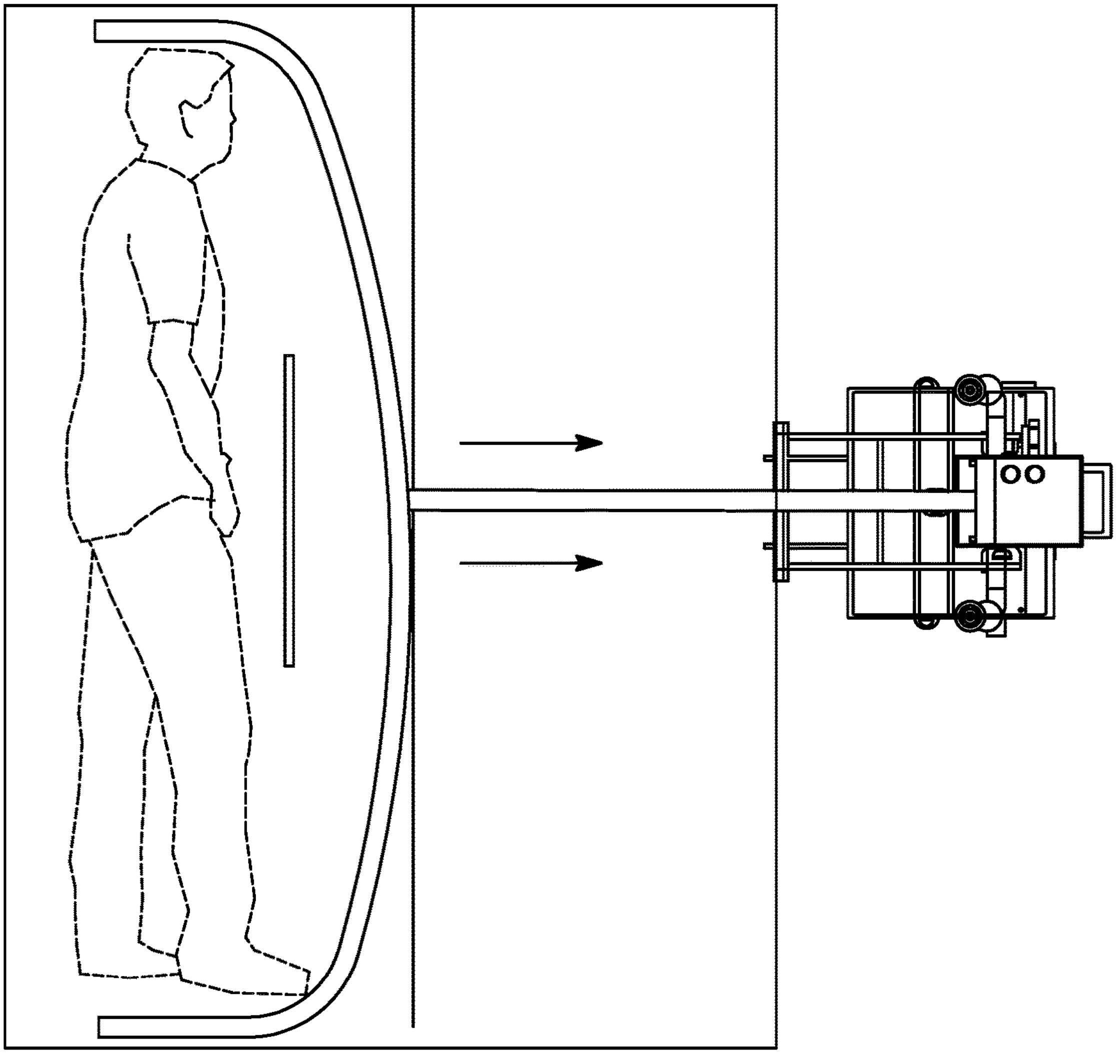
FIG. 13 of the drawings is a schematic representation of the patient slider device of the present disclosure, showing, in particular, the operation thereof.

In operation, and with reference to FIG. 13, to transfer a patient from a first bed surface to a second bed surface, the two bed surfaces are first positioned in a side by side orientation. Once the beds are positioned as desired, the patient slider device is placed adjacent a side of the second bed surface opposite the first bed surface. Generally, it is desirable to have the position of the patient slider device correspond to the center of mass of the patient.

In the configuration shown, the patient slider device is tilted and rolled to the desired position on the roller 36 by pushing or pulling the device while holding onto the handle 46, for example. Once placed as desired, the patient slider device is slowly released so that the weight transfers from the roller to the ground supports. With the winch assembly, and in turn, the majority of the weight of the device being proximate the lower end of the elongated body, the device resists tipping forward, rearward or side to side.

Prior to final positioning, the user may adjust the position of the bumper 70 of the bed engagement assembly, so that the bumper abuts the frame of the second bed. In particular, the user unlocks any locking assembly that may preclude movement of the bumper relative to the frame. Next, the user slidably moves the bumper together with the support members through the adjustment mechanism, in a generally up and down vertical orientation. This adjustment is continued until the user determines that the bumper is positioned in the desired orientation relative to the second bed. At such time, the locking assembly can be utilized to preclude further movement of the bumper relative to the frame. It will be understood that positioning of the bumper in the desired orientation may include movement of the bumper as well as movement and adjustment of the second bed (and, possibly, the first bed).

Once the bumper is positioned as desired, the sheet engaging clamp assembly is coupled to the bed sheet that underlies the patient. It is desirable to have the base member to essentially be substantially centered, where possible, relative to the mass of the patient. The second end of the winding strap is extended, often together with the sheet engaging clamp assembly 150 over the first bed surface so as to engage the sheet of the second bed surface which underlies the patient. In some configurations, it may be necessary to separate the two beds and to have access to the sheet underlying the patient (if, for example, the operator cannot reach across the first bed or between the two beds).

Once the sheet is clamped, the user can return to the patient slider device so as to actuate the same. In particular, with the configuration of the winch control system, the operator simultaneously actuates the foot switch 172, the first handle switch 174 and the second handle switch 176 (which insures that the operator is in the proper position). When actuated, the winch begins to reel the winding strap pulling the second end toward the frame. The patient slider device is maintained in the desired position by interaction of the bumper with the second bed. Eventually, the winding strap exerts a pulling force on the sheet engaging clamp assembly. In the first configuration shown, the pulling force will decrease the size of the adjustable strap loops of the transverse strap, thereby enhancing the clamping force on the sheet between the locking member and the base member.

Eventually, movement of the winding strap pulls the sheet (with the patient) from the first bed to the second bed. Once the patient is in the desired position on the second bed surface, the user can release any one of the switches to stop retraction of the winding strap. The user can then decouple the sheet from the sheet engaging clamp assembly. The patient slider device can be rolled away from the second bed by way of the roller. Depending on the configuration, the device may be coupled to a wall mount when not in use, coupled to a patient bed when not in use, or positioned on the ground support in a desired storage location.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A patient slider device comprising:

a winding strap having a first end and a second end opposite the first end;

a transverse strap attached to the second end of the winding strap, the transverse strap having a first strap loop proximate a first end thereof, and a second strap loop proximate the second end thereof;

an elongated rod comprising a first side axial valley proximate a first end thereof and a second side axial valley proximate a second end thereof, wherein the first strap loop is configured to axially slide over a first end of the elongated rod and configured to be positionable within the first side axial valley of the elongated rod, and structurally configured to clamp a sheet therebetween, and wherein the second strap loop is configured to axially slide over a second end of the elongated rod and configured to be positionable within the second side axial valley of the elongated rod, and structurally configured to clamp the sheet therebetween.

2. The patient slider device of claim 1 wherein the first side strap loop and the second side strap loop are adjustable in a size thereof.

3. The patient slider device of claim 1 wherein the first end of the winding strap is attached to a winch.

4. The patient slider device of claim 3 wherein the winch is positioned within a frame.

5. The patient slider device of claim 4 wherein the frame has a base and an elongated body, the first end of the winding strap extendable into an opening proximate an upper end of the frame with the winch being positioned proximate a lower end of the frame.

6. The patient slider device of claim 1 wherein the transverse strap is releasably attachable to the second end of the winding strap.

7. The patient slider device of claim 1 wherein the first side strap loop is formed by folding the first end of the transverse strap over itself to form a hoop through which the remainder of the transverse strap is slidably movable therethrough to form an adjustable first side strap loop.

8. The patient slider device of claim 7 wherein the second side strap loop is formed by folding the second end of the transverse strap over itself to form a hoop through which the remainder of the transverse strap is slidably movable therethrough to form an adjustable second side strap loop.

9. The patient slider device of claim 1 further comprising a frame having a base and an elongated body, and having a winch positioned within the frame, wherein the first end of the winding strap is attached to the winch.

10. The patient slider device of claim 9 wherein the elongated rod is releasably attachable to the frame.

11. The patient slider device of claim 10 wherein the elongated rod is releasably attachable to at least the elongated body of the frame.

12. The patient slider device of claim 9 further comprising a bumper structurally configured to be interfaceable with a frame of a bed, the bumper attached to the frame through a support member.

13. The patient slider device of claim 12 wherein the bumper is slidably positionable along the elongated body of the frame.

14. The patient slider device of claim 3 further including a lock to preclude slidable movement of the bumper along the elongated body of the frame.

15. The patient slider device of claim 1 wherein one of the first end and the second end of the elongated rod includes a pair of spaced apart spheres defining the respective one of the first side axial valley and the second side axial valley.

16. The patient slider device of claim 15 wherein the first end and the second end of the elongated rod each include a pair of spaced apart spheres defining the first side axial valley and the second side axial valley.

17. The patient slider device of claim 15 wherein an outer one of the pair of spaced apart spheres is smaller than the inner one of the pair of spaced apart spheres.

18. A method of moving a patient comprising the steps of:

providing a patient slider device of claim 1;

extending a portion of a sheet on which a patient is laying over the first side axial valley and over the second side axial valley;

positioning the first strap loop into the first side axial valley;

positioning the second strap loop into the second side axial valley; and pulling the second end of the winding strap.

19. The method of claim 18 further comprising the steps of:

adjusting the first strap loop after the step of positioning the first strap loop; and adjusting the second strap loop after the step of positioning the second strap loop.

20. The method of claim 18 further comprising the step of:

releasably attaching the transverse strap to the elongated rod.

* * * * *